US010044834B2

United States Patent
Wallin et al.

(10) Patent No.: US 10,044,834 B2
(45) Date of Patent: Aug. 7, 2018

(54) SYSTEMS, METHODS AND COMPUTER PROGRAM PRODUCTS FOR ENABLING A COMMUNICATION DEVICE TO PROVIDE SESSION IMPROVEMENT REQUESTS TO A SERVER OF A NETWORK OPERATOR'S ACCESS NETWORK

(71) Applicant: Telefonaktiebolaget L M Ericsson (publ)

(72) Inventors: Staffan Wallin, Lindome (SE); Aldo Bolle, Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 179 days.

(21) Appl. No.: 14/758,432

(22) PCT Filed: Feb. 7, 2014

(86) PCT No.: PCT/EP2014/052483

§ 371 (c)(1),
(2) Date: Jun. 29, 2015

(87) PCT Pub. No.: WO2014/124881

PCT Pub. Date: Aug. 21, 2014

(65) Prior Publication Data

US 2016/0014230 A1   Jan. 14, 2016

Related U.S. Application Data

(60) Provisional application No. 61/765,277, filed on Feb. 15, 2013.

(51) Int. Cl.
*H04L 29/08* (2006.01)
*H04L 12/24* (2006.01)
(Continued)

(52) U.S. Cl.
CPC .......... *H04L 67/34* (2013.01); *H04L 12/1485* (2013.01); *H04L 41/0896* (2013.01);
(Continued)

(58) Field of Classification Search
CPC ......... H04L 67/34; H04L 67/02; H04L 67/42; H04L 41/5051; H04L 41/0896
See application file for complete search history.

(56) References Cited

U.S. PATENT DOCUMENTS 5,995,849 A * 11/1999 Williams ........... H04B 7/18567
455/555
7,490,162 B1 * 2/2009 Masters .............. H04L 67/1008
370/351

(Continued)

FOREIGN PATENT DOCUMENTS

GB    2 453 647 A1    4/2009

OTHER PUBLICATIONS

International Search Report and Written Opinion dated Jun. 17, 2014 for International Application Serial No. PCT/EP2014/052483, International Filing Date—Feb. 7, 2014 consisting of 13—pages.

*Primary Examiner* — Hoang-Chuong Q Vu
(74) *Attorney, Agent, or Firm* — Rothwell, Figg, Ernst & Manbeck, p.c.

(57) ABSTRACT

This disclosure describes a system for enabling a subscriber to use a device to submit a session improvement request to a server of an access network. In one aspect, the method is performed by a service provider's server and may include: receiving from the access network a first request message transmitted by the user's communication device to the access network and a source address; and in response to receiving the first request message, generating a response to the first request and transmitting the response to the source address, wherein the step of generating the response comprises: determining whether computer code for transmitting a second request message to a server of the access network should be included in the response, wherein the determination is based at least in part on the source address.

15 Claims, 8 Drawing Sheets

(51) Int. Cl.
*H04L 29/06* (2006.01)
*H04L 12/14* (2006.01)

(52) U.S. Cl.
CPC .......... *H04L 41/5051* (2013.01); *H04L 67/02* (2013.01); *H04L 67/42* (2013.01)

(56) References Cited

U.S. PATENT DOCUMENTS

| | | |
|---|---|---|
| 2004/0063497 A1 | 4/2004 | Gould |
| 2004/0064824 A1* | 4/2004 | McNeely ................ H04L 67/02 719/316 |
| 2005/0021739 A1* | 1/2005 | Carter .................... H04L 67/02 709/224 |
| 2006/0195840 A1 | 8/2006 | Sundarrajan et al. |
| 2011/0116461 A1 | 5/2011 | Holt et al. |
| 2011/0295942 A1* | 12/2011 | Raghunath ............. H04L 45/00 709/203 |
| 2011/0317717 A1* | 12/2011 | Scarborough ....... H04L 41/0896 370/468 |
| 2012/0076009 A1* | 3/2012 | Pasko ................... H04W 4/003 370/252 |
| 2012/0113838 A1* | 5/2012 | Lim ...................... H04B 7/026 370/252 |
| 2012/0317068 A1* | 12/2012 | Ruf ...................... H04L 43/028 706/47 |

* cited by examiner

SYSTEMS, METHODS AND COMPUTER PROGRAM PRODUCTS FOR ENABLING A COMMUNICATION DEVICE TO PROVIDE SESSION IMPROVEMENT REQUESTS TO A SERVER OF A NETWORK OPERATOR'S ACCESS NETWORK

TECHNICAL FIELD

This disclosure relates to enabling a communication device to provide session improvement requests to a server of a network operator's access network.

BACKGROUND

A network operator's access network, such as, for example, a mobile communication core access network operated by a mobile network operator, enables a communication device (CD) (a.k.a., user equipment (UE)) (e.g., a mobile phone, a tablet computer, desktop computer, or other communication device) to communicate with other communication devices (e.g., Internet servers) connected to any network (such as the Internet) connected to the operator's network.

Many networks operated by a network operator have the capability to allow the network operator to configure the network to apply different rules to different sessions (e.g., different packet flows). For example, some sessions (e.g., real time voice sessions) may be given priority over other sessions (e.g., web surfing sessions). Additionally, many networks operated by a network operator have the capability to allow the network operator to define overall traffic quotas for a given subscriber (e.g., the network operator may configure its network such that a subscriber to the network has a cap on the amount of data it can send and/or receive via the network).

SUMMARY

It is advantageous to allow a subscriber of a network operated by a network operator (herein referred to as an "access network") to use his/her communication device to submit a session improvement request to a server of the access network. As used herein a "session improvement request" (a.k.a., a "session 'boost' request") is a request (or instruction) to provide special treatment for a particular session between the communication device and another communication device. As used herein, a "session" is a set of one or more packet flows (a.k.a., "traffic flows") or connections. An example of a session improvement request is a request to provide a specified quality of service for a specified session. Providing a specified quality of service to a session may include one or more of: (i) guaranteeing a certain minimum bit rate for the session, (ii) ignoring the session with respect to the network's traffic quota (e.g., not counting the session traffic against the quota), etc.

This disclosure describes system, methods and computer program products for enabling a subscriber of an access network to use his/her communication device to submit a session improvement request to a server of the access network.

In one aspect, the method is performed by a service provider's server (i.e., a server operated by or on behalf of a party, other than the network operator, that provides a service to the user). The method includes the service provider's server receiving from a gateway of the access network a first request message transmitted by the user's communication device to the access network and a source address. The method also includes the service provider's server, in response to receiving the first request message, generating a response (e.g., an HTML document) to the first request and transmitting the response to the source address. The step of generating the response includes: determining whether computer code for transmitting a boost message towards a boost server of the access network should be included in the response; and including said computer code in the response in response to determining that said computer code should be included in the response.

In some embodiments, the determining step comprises determining a network operator based on the source address and determining whether the network operator is included in a predefined set of network operators. The determining step may further include the steps of: transmitting to the access network a second request message comprising the source address in response to determining that the network operator is included in the predefined set of network operators, receiving a response to the second request message, and parsing the response. In some embodiments, the source address includes a network address (e.g., IP address) and may also include a port number (e.g., a TCP port number).

In some embodiments, the computer code comprises instructions (or a pointer to instructions) that are configured to automatically cause the subscriber's communication device to transmit a message addressed to an application (e.g., HTTP server) executing on a server in the access network, wherein the application is operable to cause the server to transmit to the subscriber's communication device computer code comprising instructions that are configured to: (i) display an activatable user interface element (e.g., button, hyperlink, etc.) and (ii) cause the subscriber's communication device to transmit to an application executing on a server in the access network a session improvement request comprising an address included in the computer code (or in code pointed to by the computer code).

In other embodiments, the computer code comprises instructions (or a pointer to instructions) that are configured to: (i) display an activatable user interface element (e.g., button, hyperlink, etc.) and (ii) cause the subscriber's communication device to transmit to an application executing on a server in the access network a session improvement request comprising an address included in the computer code (or in code pointed to by the computer code).

The computer code may comprise one or more of: an instruction in the form of a hypertext markup language (HTML) tag, for example an "iframe" tag, a pointer to a JavaScript script file in the form of an HTML "script" tag, a pointer to a code object (e.g., Flash file) in the form of an "object" tag or an "embed" tag, and a set of JavaScript instructions.

In another aspect, the method is performed, at least in part, by a boost server operated by or on behalf of a network operator. In some embodiments, the method performed by the boost server includes the boost server receiving from a service provider server operated by a service provider, which service provider is separate and distinct from the network operator, a first message comprising an address received by the service provider, wherein the address was allocated to a communication device by an access network operated by the network operator. The method also includes, in response to receiving the first message, the boost server determining whether a QoS of one of the communication device's sessions can be boosted, wherein the determination is based at least in part on the address allocated to the communication device. The method further includes the boost server, after performing the determining step, sending to the service provider server a second message indicating the outcome of said determination.

The service provider server may provide services to end-users or may provide services to other service providers (i.e., the service provider server may be a broker server).

In some embodiments, the method performed by the boost server includes the boost server receiving a session improvement request transmitted from the communication device, wherein a parameter of the session improvement request identifies at least one of a server and a sub-network. The method also includes, in response to receiving the session improvement request (SIR), the boost server increasing the quality of service that the access network provides to a session terminated at one end at the communication device and terminated at the other end at (i) a communication device that is a member of the sub-network identified by the parameter of the SIR or (ii) the server identified by the parameter of the SIR.

In some embodiments, the step of increasing the quality of service provided to the session consists of one or more of: (i) guaranteeing a certain minimum bit rate for the session, (ii) ignoring the session with respect to the access network's traffic quota applicable to the communication device, (iii) apply a priority class for the session and (iv) apply special handling of the session based on the type of traffic.

In some embodiments, the step of increasing the quality of service provided to the session comprises the boost server transmitting to a PCRF of the access network a message identifying the session and identifying a QoS parameter.

In some embodiments, the step of receiving the SIR comprises receiving an HTTP message containing the parameter of the SIR.

In some embodiments, the method performed by the boost server includes: the boost server receiving a request for QoS boost options transmitted from the communication device. In such embodiments, the method also includes, in response to receiving the request (SIR), the boost server generating a response to the request and transmitting the response to the communication device, wherein the response includes computer code that provides the user of the communication with a user interface means to command an application running on the communication to cause the communication device to transmit a session improvement request to a node of access network. In some embodiments, the user interface means is an activatable button or hyperlink.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
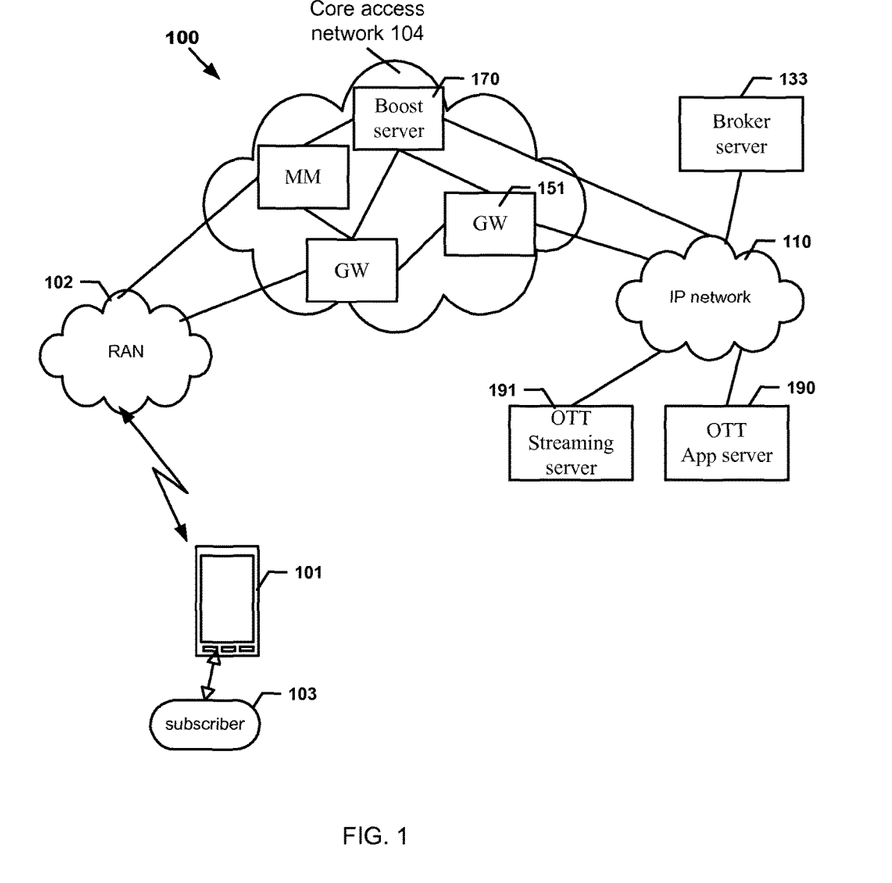
FIG. 1 illustrates an example generic communications network.

FIG. 1 illustrates an example network 100 which, in this example is a mobile communications network that includes a radio access network (RAN) 102 and a core access network 104. In some embodiments, a network operator operates both the core access network 104 and the RAN 102, but in other embodiments, the network operator operates only the core access network 104 and another, different operator operates RAN 102. In other embodiments, network 100 may not include a RAN component, such as a cable network operated by a cable network operator.

As illustrated in FIG. 1, network 100 provides a communication device with the ability to communicate with other communication devices, such as an over-the-top (OTT) application server 190 and a streaming server 191 that is connected to a network 110, such as the Internet or other Internet Protocol (IP) network.

As used herein a "server" is a set of one or more physical machines (e.g., personal computers, server computers, blade servers, etc.), which machines may be co-located or distributed, that function to provide a service. Each such physical machine may execute the same or a different set of application programs, such as a hypertext transfer protocol (HTTP) server program, which is commonly referred to as a "web server." Additionally, each such physical machine may execute one or more virtual machines, and each virtual machine may execute a server program (e.g., a web server).

As discussed above, it is advantageous to allow a subscriber (or "user") 103 of access networks 102 and 104 to use his/her user equipment (UE) 101 (e.g., mobile phone, laptop computer, tablet computer, desktop computer, personal digital assistant, or other communication device) to submit a session improvement request to a server 170 of the core access network 104 that is operable to improve a session between the UE 101 and another communication device. Such a server 170 is referred to as a "session boost server" (or "boost server" for short) as boost server 170 has the ability to increase the quality of service provided to a session. In embodiments where boost server 170 is a component of a core access network that conforms to a 3GPP specification, the boost server 170 may be a component of, or have the ability to communicate with, a Policy Charging and Rules Function (PCRF) of the core access network.

This disclosure proposes, in some embodiments, an approach, having minimal business complexity, where a network operator interacts with an OTT service provider and/or the OTT's service provider's end users to allow the service provider to enable its end users to have some control over the QoS provided by the network operator's access network without introducing a complex business arrangement between the network operator and the OTT service provider. To further facilitate this, the network operator may freely publish and allow free usage of a protocol (e.g., application programming interface (API)) and computer code (e.g., script) for implementing the protocol/API. Any service provider may utilize the published API and computer code (e.g., embed a script into their web page or native application).

Thus, for example, a network operator may publish an open API that allows OTT service providers to control and customize the way their service traffic is handled though out the network operator's access network. The API can be used by any service provider without any separate agreement with the network operator. When using the API the service provider may configure it with the QoS settings suitable for the provided service. The API may run in the background. The API may be invoked when a user accesses the service, by launching an application or by visiting a web site through a browser. A user interface element (e.g., button, textual hyperlink, etc.) may be displayed on the web page or in the application in cases where the service is accessed through the network operator's network and other conditions are met. It will give the user the possibility to apply the proposed QoS settings by the service provider. Any additional fees for the transaction may be handled within the existing agreement between the subscriber and the network operator.

One driver for the service provider to include the API function with the service is to increase the quality of experience for users accessing the service by informing the operator on service requirement and traffic type. For the operator this may lead to increased revenues from users accessing QoS demanding internet services that the operator chose to charge for. Note that even without increased QoS it is a benefit to let the operator to know traffic type, i.e. Video, Voice or other. The operator may or may not choose to charge for the requested configuration.

As the user option may only be visible to a user who is subscribed to a particular operator network, a service provider may include one of multiple API functions with the service, one for each operator in the market where the service is offered. This increases the chance that users of the service can take benefit of the QoS settings and thereby experiencing a better quality of service.

Figure 2:
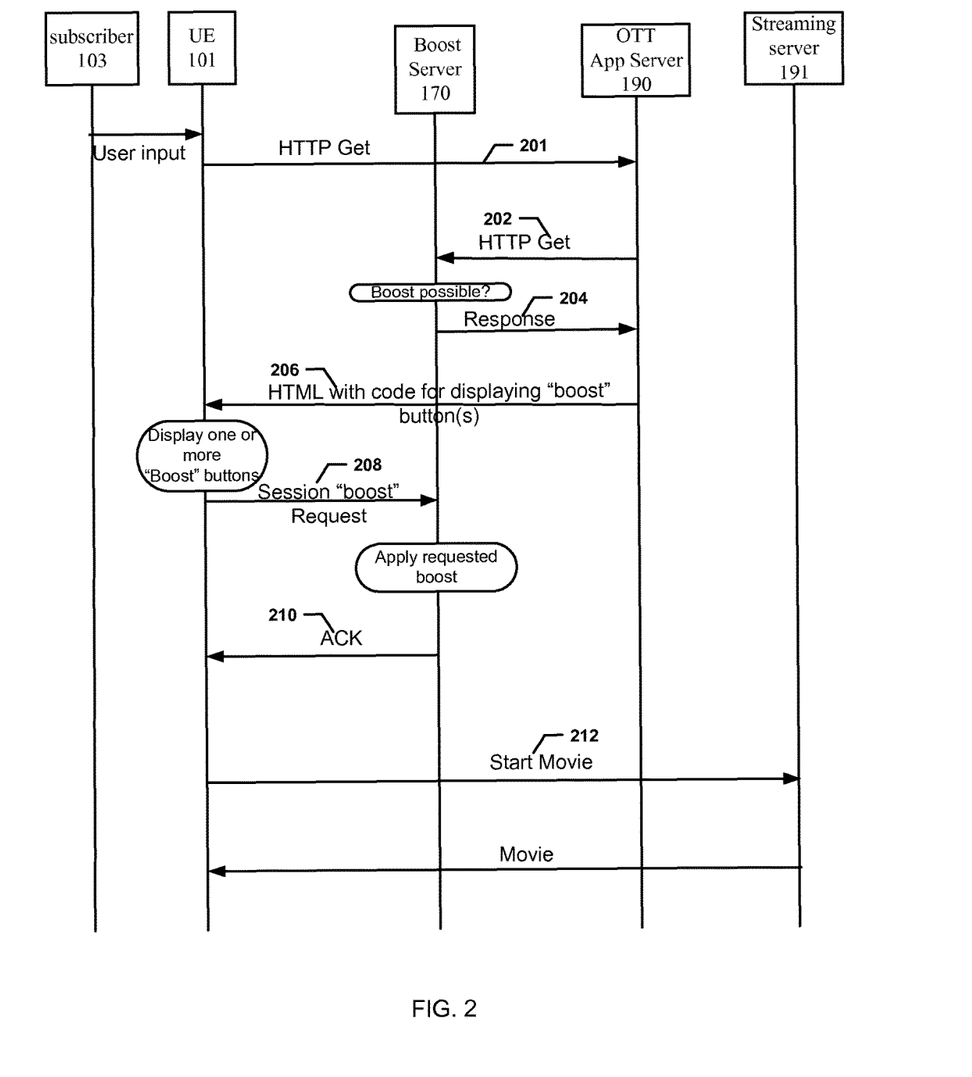
FIG. 2. illustrates an example message flow diagram according to one embodiment.

Referring now to FIG. 2, FIG. 2 is a message flow diagram illustrating a possible use case. The use case may begin with user 103 providing user input to UE 101 (e.g., activating a hyperlink in a web page, launching an application, or otherwise providing user input to UE 101).

In response, UE 101 creates a message 201 (e.g., an application layer message such as, but not limited to, a hypertext transfer protocol (HTTP) GET message) and provides the message 201 to network 100, which routes the message 201 to server 190 (e.g., routes message 201 to one of the physical machines that comprise server 190). For example, the message 201 may be received by a gateway (GW) (e.g. GW 151) of network 100 and forwarded from the GW 151 towards server 190 using a set of one or more network packets (e.g., IPv4 or IPv6 packets), each of which includes a header that contains a source network address and a payload portion. Each payload portion of the network packet may include a transport packet comprising a header that contains a source port number and a payload portion. Each payload portion of the transport packet contains at least part of the message 201. The server 190 receives the set of packets containing the message 201 and performs some actions based on the content of message 201. The actions may include server 190 determining the access network to which UE 101 is attached based on addressing information in the IP packets that encapsulated message 201. After determining the access network, server 190 determines whether the determined access network includes a boost server and the network address of the boost server (e.g., the IP address of the boost server, the domain name of the boost server, etc.), if there is one.

As illustrated in FIG. 2, the actions performed by server 190 in response to message 201 may further include server 190 creating a message 202 and transmitting message 202 towards the determined boost server (which in this use case is boost server 170). The message 202 includes information associated uniquely with UE 101 (i.e., a UE-ID associated with UE 101).

For example, the UE-ID may be an address allocated to UE 101 by network 104. In some embodiments, the address consists of the source address from the network packets that were received by server 190 and that encapsulated message 101. Thus, the address may be an IP address. In other embodiments, the address consists of (1) the source address from the network packets that were received by server 190 and that encapsulated the transport packets that encapsulated the message 101 and (2) the source port number from the transport packets. Thus, the address, in other embodiments may be an IP address/TCP port number tuple or an IP address/UDP port number tuple.

The message 202 may also include information uniquely identifying a particular service (i.e., the information may consists of an IP address and TCP or UDP port number), a particular server (e.g., server 190, server 191), a particular sub-network of IP network 110, traffic type (e.g real-time video), desired bit rate for a session, and/or desired priority class for the session.

In response to receiving message 202, boost server 170 uses the UE-ID included in message 202 to determine whether server 190 may enable UE 101 to send a session improvement request to the access network 104. Boost server 170, after performing the determination, sends to server 190 a message 204 indicating the outcome of said determination. For example, the message 204 may include a first predetermined value to indicate that server 170 determined that server 190 should not enable UE 101 to send a session improvement request and the message 204 may include a second predetermined value to indicate that server 170 determined that server 190 may enable UE 101 to send a session improvement request.

In response to receiving message 204, server 190 examines the content of the message 204 to determine whether to include certain computer code in a response 206 to message 201. For example, if message 204 includes the second predetermined value, then server 190 will include the computer code in the response 206, otherwise it will not. For simplicity of explanation, we shall assume that message 204 includes the second predetermined value, and, thus, response 206 includes the computer code.

After generating the response 206, server 190 transmits the response to UE 101. The response may be an HTML document and the computer code in included in the response may be an HTML tag (e.g., an object tag, an iframe tag, an img tag, a script tag, an embed tag, etc.) or JavaScript code included in the HTML document.

In this use case, the computer code includes: (1) a value identifying a server in access network 104 (e.g., boost server 170); (2) information uniquely identifying a particular service (i.e., the information may consists of an IP address and TCP or UDP port number), a particular server (e.g., server 190, server 191), and/or a particular sub-network of IP network 110; and (3) a quality of service (QoS) identifier. In other use cases, computer code may contain other information as well, and only elements (1) and (2), but not (3) or only element (2) and not (1) or (3), or some other combination.

In this example use case, the computer code included in response 206 causes an application running in UE 101 to display an activatable user interface element on a display screen of UE 101. The activatable user interface element may be in the form of a button, a hyperlink, a menu item, etc. UE 101, in response to user 103 activating the activatable user interface element, sends towards the server identified in the computer code (which for the sake of illustration we shall assume is boost server 170) a session boost message 208. Session boost message 208 may be a session improvement request and the session improvement request may include elements (2) and (3) mentioned above (i.e., a QoS identifier and information identifying a service, server and/or sub-network).

In other use cases, rather than cause the UE 101 to display the user interface element, the computer code included in response 206 causes UE 101 to automatically send towards the server identified in the computer code (which for the sake of illustration we shall assume is boost server 170) the session boost message 208.

In response to receiving message 208, boost server 170 applies the requested session boost and sends an acknowledgement 210. For example, boost server 170 may configure a physical network node in network 104 to provide a high QoS for a certain amount of time to any session between UE 101 and a device in the identified sub-network that traverses network 104. As another example, boost server 170 may configure nodes in network 104 to, for some period of time, ignore for traffic quota purposes a session between UE 101 and a device in the identified sub-network.

In other use cases, the computer code does not cause UE 101 to send a session improvement request 208 in response to a user activating the activatable element. Rather, the code may cause UE 101 to send to boost server 170 a request for available QoS options or other session boost message. In response to that request, boost server 170 sends to UE 101 a response that identifies the available options and allows a user to select one of the options. In response to the user selecting one of the options, UE 101 at that time sends the session boost request 208.

In any event, after the session is boosted, user 103 may use UE 101 to download a movie (or other content) from a server included in the sub-network. That is, UE 101 may send a request 212 to streaming server 191 to begin streaming a movie. In response, streaming server 191 begins to stream the movie to UE 101.

In this way, user 103 can have some control over the quality of the session the user 103 established with the streaming media server (or any other service).

As illustrated in the above use case, a service provider to can "inject" instructions into, for example, its web pages, to allow its end users to request that the network operator provide customized handling of a session between a service provider server and the user's communication device. Moreover, because there is a dialog between the network operator and the end user (see e.g., message 208 and 210), the network operator can charge the user directly for this service, without requiring any business agreement or relationship between the network operator and the service provider. This is important because the huge number of agreements (between the hundreds of network operators around the world and the thousands of OTT service providers around the world) that would be needed is a large obstacle for a successful business. Service providers will benefit in adding the "boost" button reference to their service as it will enhance the quality of experience for their service.

While FIG. 2 illustrates UE 101 sending message 208 directly to boost server 170, in other embodiments UE 101 communicates with boost server 170 indirectly. For example, instead of UE 101 sending message 208 directly to boost server 170, UE 101 may send message 208 toward boost server 170 by sending message 208 directly to another server (e.g., server 190 or broker server 133) and that other server (e.g. server 190, broker server 133, etc.) forwards message 208 to boost server 170.

Figure 3:
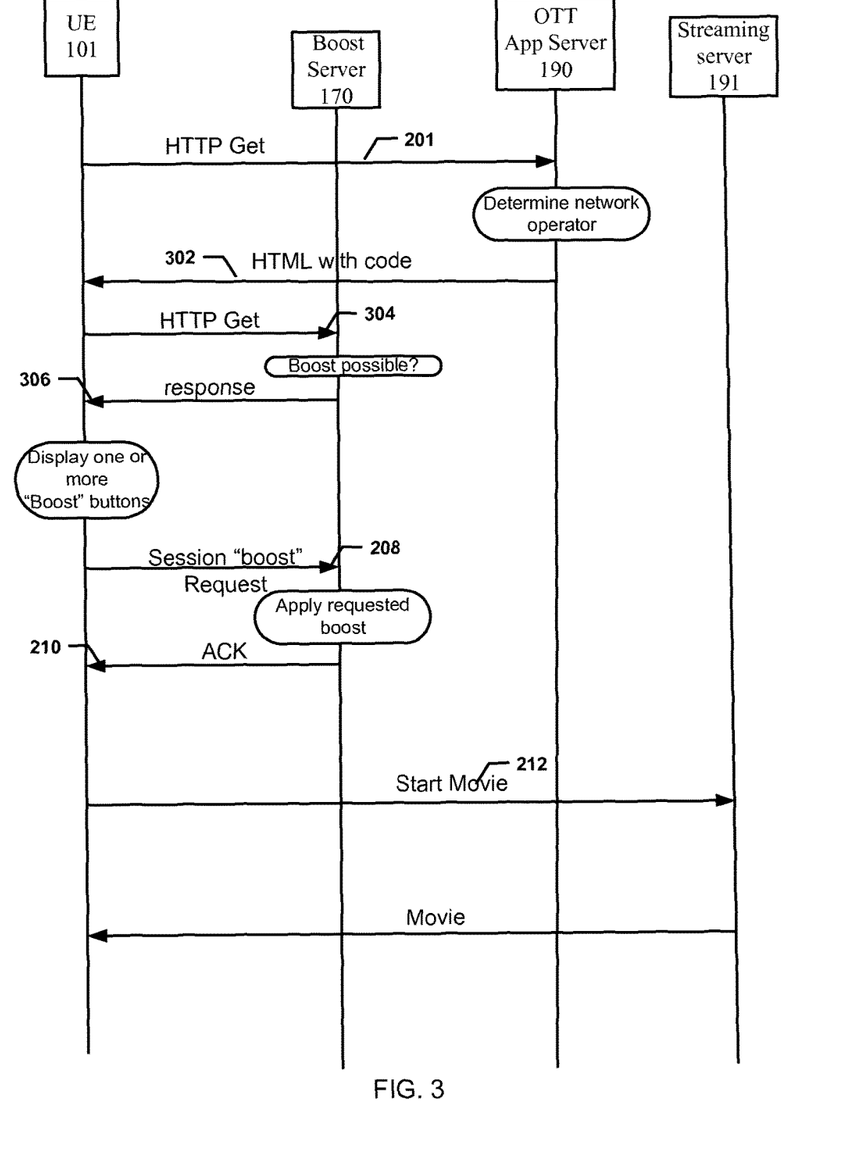
FIG. 3. illustrates another example message flow diagram according to another embodiment.

Referring now to FIG. 3, FIG. 3 is a message flow diagram illustrating a possible use case. The use case may begin with user 103 providing user input to UE 101 (e.g., activating a hyperlink in a web page, launching an application, or otherwise providing user input to UE 101). In response, UE 101 creates message 201 and provides the message 201 to network 100, which routes the message 201 to server 190 using one or more IP packets.

In response to receiving message 201, server 190 performs some actions. The actions may include server 190 determining the access network to which UE 101 is attached based on addressing information in the IP packets that encapsulated message 201. After determining the access network, server 190 determines whether the determined access network includes a boost server and the network address of the boost server, if there is one. Next, assuming server 190 determines the network address of a boost server, serer 190 generates a response 302 to message 201, which response 302 includes computer code that is configured to automatically cause UE 101 to send to the identified boost server a boost message 304 containing predetermined parameters (e.g., it causes UE 101 to send message 304 to an application executed by the boost server). The predetermined parameters may include zero or more of: (1) information uniquely identifying a particular service, (2) information uniquely identifying a particular server (e.g., server 190, server 191), (3) information uniquely identifying a particular sub-network of IP network 110, and (4) a quality of service (QoS) identifier. Server 190 transmits response 302 to UE 101.

UE 101, in response to receiving response 302, parses the response and, based on information (e.g., computer code) in the response 302, automatically (i.e., without user intervention), sends boost message 304 to boost server 170 (e.g., to an application running on boost server 170). Boost server 170, in response to boost message 304, determines whether it is able to boost a session between UE 101 and a particular device or any device in a particular sub-network. If it can, boost server 170 sends a response 306 to UE 101 (e.g., the application running on the boost server 170 causes the boost server 170 to transmit response 306), which response 306 causes an application running on UE 101 (e.g., web browser) to display an activatable user interface element (e.g., a "boost your session button"). The user 103 of UE 101 may activate the user interface element and, if that happens, UE 101 sends session improvement request 208 to boost server 170 or another server identified in the response 306.

Figure 4:
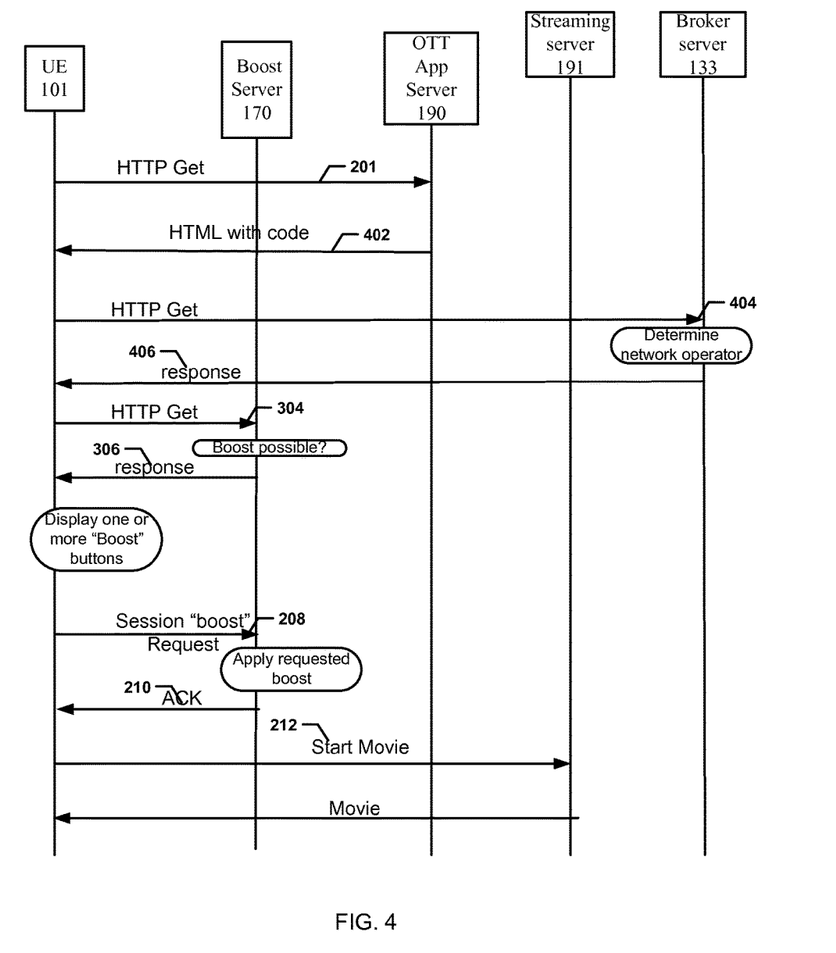
FIG. 4. illustrates another example message flow diagram according to another embodiment.

Referring now to FIG. 4, FIG. 4 is a message flow diagram illustrating a possible use case in which a broker is employed.

The use case may begin with user 103 providing user input to UE 101. In response, UE 101 creates message 201 and provides the message 201 to network 100, which routes the message 201 to server 190 using one or more IP packets. In response to receiving message 201, server 190 performs some actions. The actions may include server 190 generating a response 402 and transmitting response 402 to UE 101. In this use case, response 402 includes computer code that causes UE 101 to automatically send a message 404 to a broker server operated by a broker.

In response to receiving message 404 via the IP network 110, the broker server 133 performs some actions. The actions may include the broker server 133 determining the access network to which UE 101 is attached based on addressing information in IP packets that encapsulated message 201. After determining the access network, broker server 133 determines whether the determined access network includes a boost server and the network address of the boost server, if there is one. Next, assuming broker server 133 determines the network address of a boost server, broker server 133 generates a response 406 to message 404, which response 406 includes computer code that is configured to automatically cause UE 101 to send to the identified boost server message 304 containing predetermined parameters. The predetermined parameters may include zero or more of: (1) information uniquely identifying a particular service, (2) information uniquely identifying a particular server (e.g., server 190, server 191), (3) information uniquely identifying a particular sub-network of IP network 110, and (4) a quality of service (QoS) identifier. Broker server 133 transmits response 406 to UE 101, which causes UE 101 to send message 304 to boost server 170. In response to message 304, boost server 170 sends to UE 101 response 306, as described above. After receiving message 306, UE 101 may send to boost server 1780 message 208 (described above) and then start streaming content from streaming server 191 (see e.g., message 212).

Figure 5:
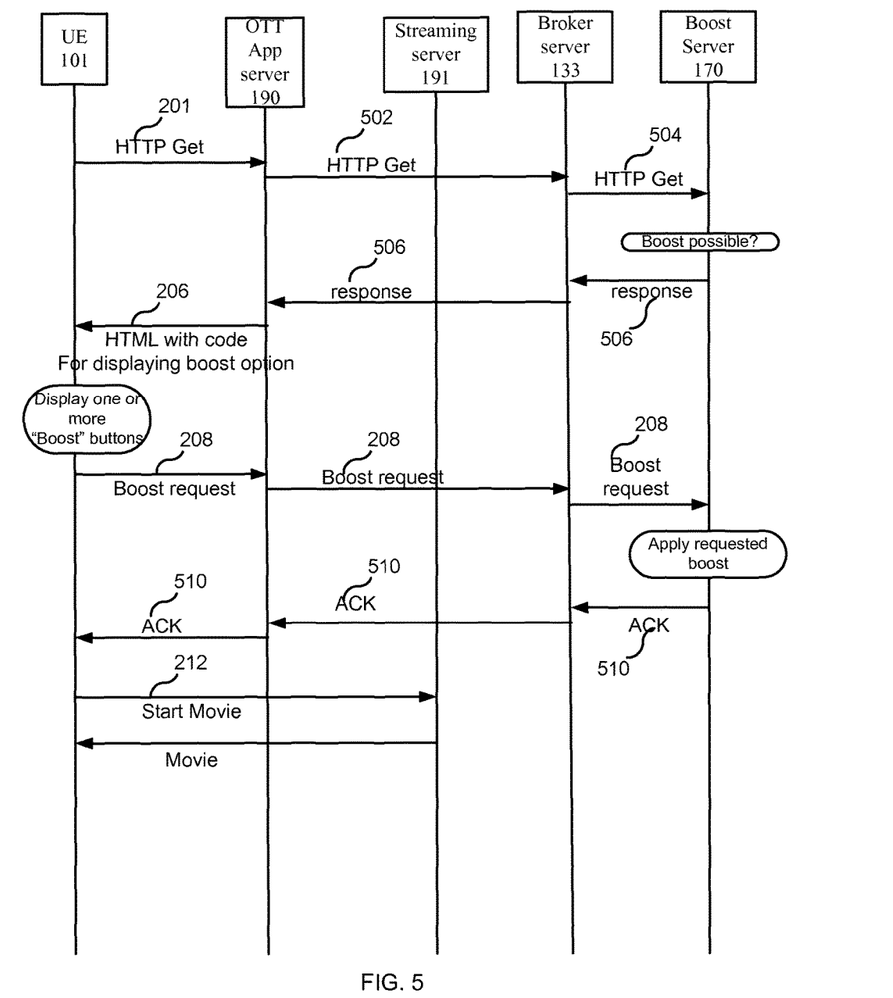
FIG. 5. illustrates another example message flow diagram according to another embodiment.

FIG. 5 is a message flow diagram illustrating another possible use case. The use case may begin with user 103 providing user input to UE 101. In response, UE 101 creates message 201 (e.g., HTTP GET message) and provides the message 201 to network 100, which routes the message 201 to server 190 using one or more IP packets. In response to receiving message 201, server 190 performs some actions. The actions may include server 190 sending to broker server 133 a message 502 (e.g., an HTTP GET message). Message 502 may include the same information that is included in message 202 described above. In response to receiving message 502, broker server 133 transmits to boost server 170 a message 504 (e.g., an HTTP GET message). Like message 502, message 504 may include the same information that is included in message 202.

In response to receiving message 504, boost server 170 uses information (e.g., a UE-ID) included in message 504 to determine whether server 190 may enable UE 101 to send a session boost message (e.g. message 208 or other session boost message) to the access network 104. Boost server 170, after performing the determination, sends to broker server 133 a response 506 indicating the outcome of the determination. For example, the message 506 may include a first predetermined value to indicate that server 170 determined that server 190 should not enable UE 101 to send a session improvement request and the message 204 may include a second predetermined value to indicate that server 170 determined that server 190 may enable UE 101 to send a session improvement request. In response to receiving message 506, broker server 133 forwards message 506 to server 190.

In response to receiving message 506, sever 190 examines the content of the message 506 to determine whether to include certain computer code in response 206 to message 201. For example, if message 506 includes the second predetermined value, then server 190 will include the computer code in the response 206, otherwise it will not. For simplicity of explanation, we shall assume that message 204 includes the second predetermined value, and, thus, response 206 includes the computer code.

After generating the response 206, server 190 transmits the response to UE 101. The response may be an HTML document and the computer code in included in the response may be an HTML tag (e.g., an object tag, an iframe tag, an img tag, a script tag, an embed tag, etc.) or JavaScript code included in the HTML document. In this use case, the computer code may include: (1) information identifying server 190 (e.g., server 190's hostname) (1) information uniquely identifying a particular service (i.e., the information may consists of an IP address and TCP or UDP port number), a particular server (e.g., server 190, server 191), and/or a particular sub-network of IP network 110; and (2) a quality of service (QoS) identifier. In this example use case, the computer code included in response 206 causes an application running in UE 101 to display an activatable user interface element on a display screen of UE 101. The activatable user interface element may be in the form of a button, a hyperlink, a menu item, etc.

UE 101, in response to user 103 activating the activatable user interface element, sends to the server identified in the computer code (which for the sake of illustration we shall assume is server 190) a session boost message 208. Session boost message 208 may be a session improvement request and the session improvement request may include elements (2) and (3) mentioned above (i.e., a QoS identifier and information identifying a service, server and/or sub-network). In response to receiving message 208, server 190, forwards message 208 to broker server 133, which forwards message 208 to boost server 170. In response to receiving message 208, boost server 170 applies the requested session boost and sends an acknowledgement 510 to broker server 133, which forward the acknowledgement to server 190, which forward the acknowledgement to UE 101.

Figure 6:
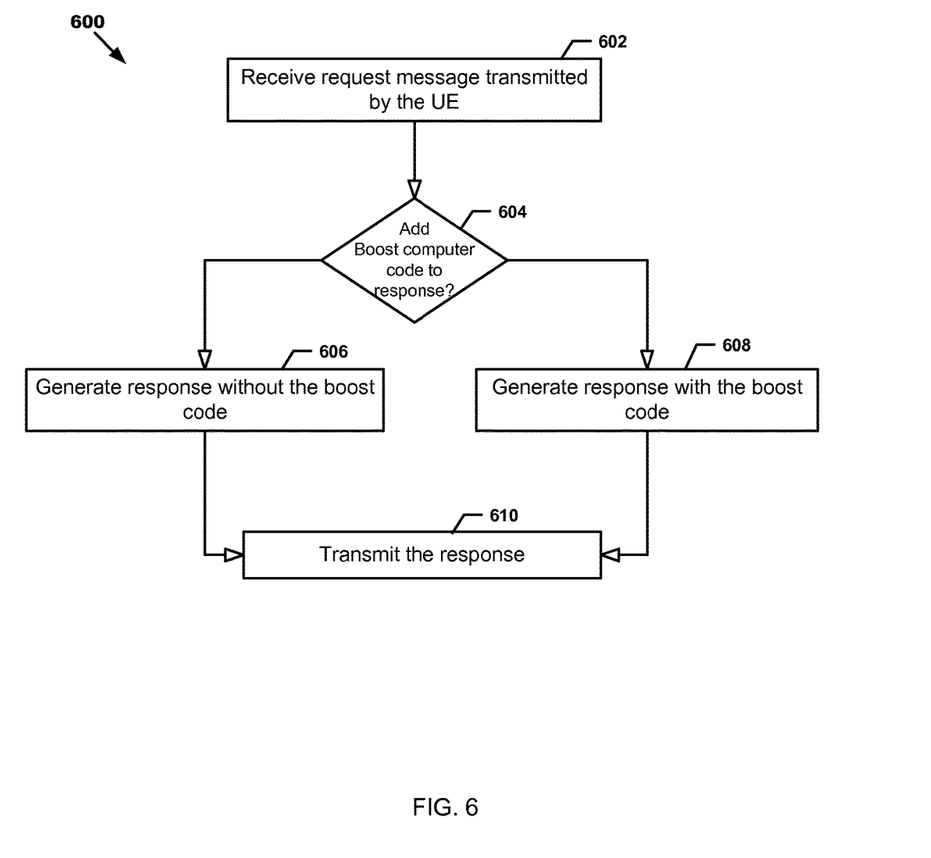
FIG. 6 is a flowchart illustrating a process according to some embodiments.

FIG. 6 is a flow chart illustrating a process 600 performed by a service provider server 190. Process 600 may begin in step 602, where the server receives a request (e.g., request 201) transmitted by the UE 101. The request may be an HTTP request message, such as an HTTP GET, PUT or POST message. In response to receiving the message, server 190 determines whether to add certain computer code to a response (step 604). The determination may be based on an access network that UE 101 is utilizing to communicate with server 190. Server 190 may be able to determine the access network that is being utilized by using a source IP address included in a packet that encapsulated at least a portion of the request. In step 606, server 190 generates a response (e.g., HTML document) that includes the certain computer code (which code is referred sometimes as "boost code." In step 608, server 190 generates a response that does not include the boost code. In step 610, server 190 transmits the response to the UE 101. If the response includes the boost code, then, in some embodiments, the boost code may cause the UE 101 to automatically send a request to a server associated with the determined access network (i.e., a server operated by the network operator that operates the access network). In other embodiments, the boost code, if present in the response, causes the UE 101 to display a user interface element that the user can activate, wherein, upon such activation, the UE 101 transmits a request to a server associated with the access network.

Figure 7:
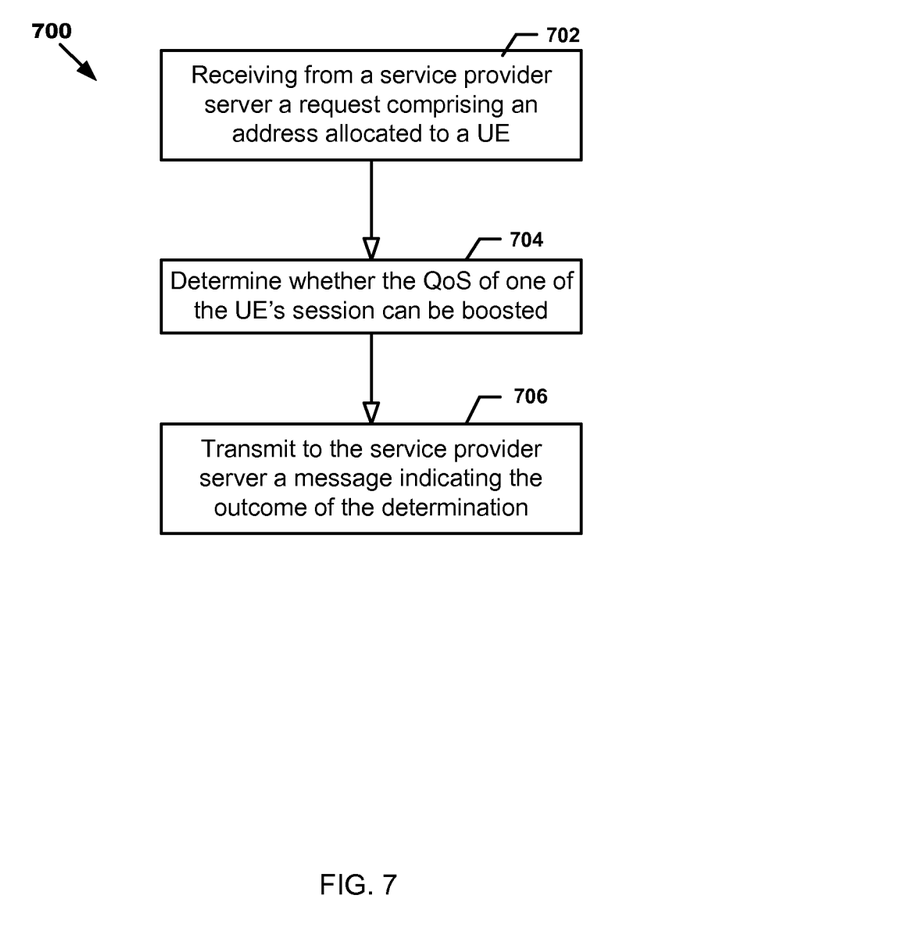
FIG. 7 is a flowchart illustrating a process according to some embodiments.

FIG. 7 is a flow chart illustrating a process 700 performed by network operator server (NOS) that is operated by a network operator that operates an access network. Process 700 may begin in step 702, where the NOS receives from a service provider server a request comprising an address allocated to a UE that is using the access network to communicate with the service provider server. In step 704, the NOS determines whether the QoS of one of the UE's sessions can be boosted. In step 706, the NOS transmits to the service provider server a response indicating the outcome of the determination of step 704. Depending on the outcome of the determination, the service provider server may choose to ad certain computer code to a response that it has generated for the UE.

Figure 8:
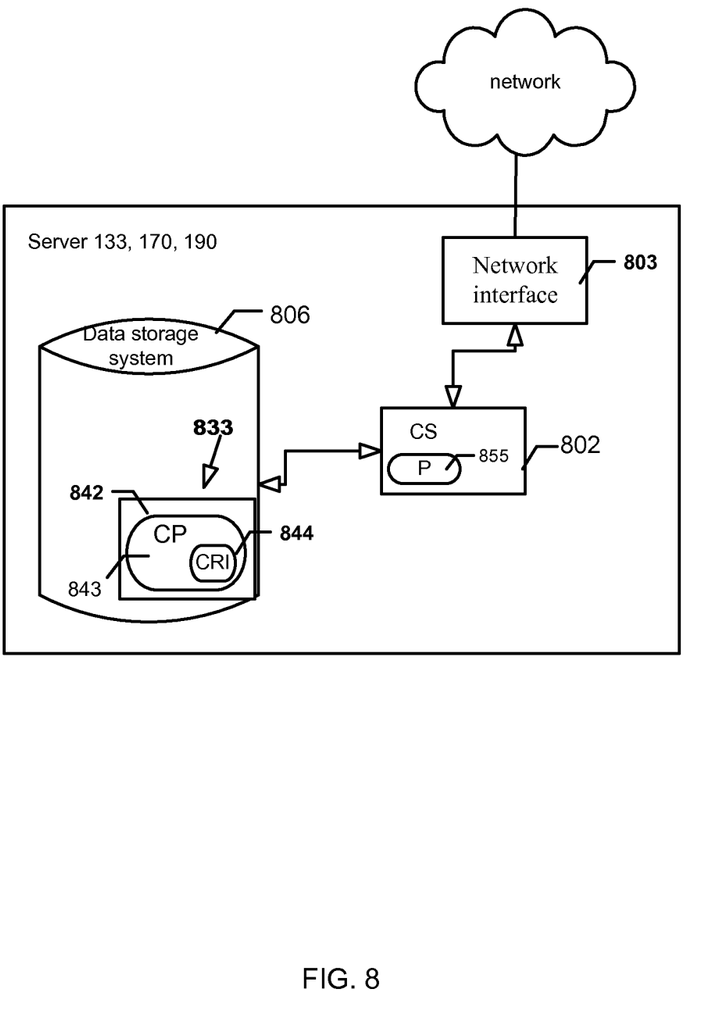
FIG. 8 is a block diagram of the servers according to some embodiments.

FIG. 8 illustrates a block diagram of server (e.g., server 190, 170 or 133), according to some embodiments. As shown in FIG. 8, the server may include: a data processing system 802, which may include one or more data processing devices (e.g., a blade server, a server computer, etc.) each having one or more processors (e.g., a microprocessor) and/or one or more circuits, such as an application specific integrated circuit (ASIC), Field-programmable gate arrays (FPGAs), etc.; a network interface 805 for receiving message from a network and transmitting messages to the network; a data storage system 806, which may include one or more computer-readable data storage mediums, such as non-transitory data storage apparatuses (e.g., hard drive, flash memory, optical disk, etc.) and/or volatile storage apparatuses (e.g., random access memory (RAM)).

In embodiments where data processing system 802 includes a processor (e.g., a microprocessor), a computer program product may be provided, which computer program product includes: computer readable program code 843 (e.g., instructions), which implements a computer program, stored on a computer readable medium 842 of data storage system 806, such as, but not limited to magnetic media (e.g., a hard disk), optical media (e.g., a DVD), memory devices (e.g., random access memory), etc. In some embodiments, computer readable program code 843 is configured such that, when executed by data processing system 802, code 843 causes the processing system 802 to perform steps described above (e.g., steps describe above including the steps described with reference to the message flow diagrams shown in FIGS. 2-5 and the flow charts shown in FIGS. 6-7).

In other embodiments, the server may be configured to perform steps described above without the need for code 843. For example, data processing system 802 may consist merely of specialized hardware, such as one or more application-specific integrated circuits (ASICs). Hence, the features of the present invention described above may be implemented in hardware and/or software. For example, in some embodiments, the functional components of server described above may be implemented by data processing system 802 executing program code 843, by data processing system 802 operating independent of any computer program code 843, or by any suitable combination of hardware and/or software.

While various embodiments of the present disclosure have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for improving a communication session, the method being performed by a service provider's server, the method comprising:
the service provider's server receiving from a gateway of an access network:
i) a first request message transmitted by a communication device to the access network; and
ii) a source address;
the service provider's server, in response to receiving the first request message, generating a response to the first request message; and
the service provider's server transmitting the response to the source address; and
generating the response comprising:
i) determining whether computer code for transmitting a boost message towards a boost server of the access network should be included in the response; and
ii) including said computer code in the response in response to determining that said computer code should be included in the response.

2. The method of claim 1, wherein determining whether said computer code should be included in the response comprises:
determining a network operator based on the source address; and
determining whether the network operator is included in a predefined set of network operators.

3. The method of claim 2, wherein determining whether said computer code should be included in the response further comprises:
transmitting to the access network a second request message comprising the source address in response to determining that the network operator is included in the predefined set of network operators;
receiving a response to the second request message; and
parsing the response to the second request message.

4. The method of claim 1, wherein the source address comprises a network address.

5. The method of claim 4, wherein the source address further comprises a port number.

6. The method of claim 1, wherein the computer code comprises instructions or a pointer to instructions that are configured to automatically cause the communication device to transmit a message addressed to an application executed by the boost server.

7. The method of claim 6, wherein the application is configured to cause the boost server to transmit a response to the communication device, the response comprising computer code comprising instructions that are configured to:
i) display an activatable user interface element; and
ii) cause the communication device to transmit a session improvement request comprising one of:
an address included in the computer code; and
in code pointed to by the computer code.

8. The method of claim 1, wherein the computer code comprises one of instructions and a pointer to instructions that are configured to:
i) display an activatable user interface element; and
ii) cause the communication device to transmit to an application executed by the boost server a session improvement request comprising one of:
an address included in the computer code; and
in code pointed to by the computer code.

9. The method of claim 1, wherein the computer code comprises at least one of:
a hypertext markup language, HTML, tag;
a pointer to a JavaScript script file; a pointer to a code object; and
a set of JavaScript instructions.

10. A service provider's server for improving a communication session, the service provider's server comprising a computer system and a non-transitory computer readable medium, said non-transitory computer readable medium storing computer readable instructions executable by said computer system, said service provider's server being configured to:
receive from a gateway of an access network:
i) a first request message transmitted by a communication device to the access network; and
ii) a source address;
in response to receiving the first request message, generate a response to the first request message;
transmit the response to the source address; and the service provider's server being configured to generate the response by:
i) determining whether computer code for transmitting a boost message towards a boost server of the access network should be included in the response; and
ii) including said computer code in the response in response to determining that said computer code should be included in the response.

11. The service provider's server of claim 10, wherein the service provider's server is configured to determine whether said computer code should be included in the response by:
determining a network operator based on the source address; and
determining whether the network operator is included in a predefined set of network operators.

12. The service provider's server of claim 11, wherein the service provider's server is configured to determine whether said computer code should be included in the response by further:
transmitting to the access network a second request message comprising the source address in response to determining that the network operator is included in the predefined set of network operators;
receiving a response to the second request message; and
parsing the response to the second request message.

13. The service provider's server of claim 10, wherein the computer code comprises one of instructions and a pointer to instructions that are configured to automatically cause the communication device to transmit a message addressed to an application executed by the boost server.

14. The service provider's server of claim 10, wherein the computer code comprises one of instructions and a pointer to instructions that are configured to:
i) display an activatable user interface element; and
ii) cause the communication device to transmit to an application executed by the boost server a session improvement request comprising one of:
an address included in the computer code; and
in code pointed to by the computer code.

15. A computer program product for improving a communication session, the computer program product comprising a non-transitory computer readable medium storing computer readable instructions, the instructions comprising:
instructions for generating a response to a first request message transmitted by a communication device to an access network, the communication device being associated with a source address;
instructions for transmitting the response to the source address; and
the instructions for generating the response comprising:
i) instructions for determining whether computer code for transmitting a second request message to a boost server of the access network should be included in the response, the determination being based at least in part on the source address; and
ii) instructions for including said computer code in the response in response to determining that said computer code should be included in the response.

* * * * *